April 11, 1961   L. R. NETHERTON ET AL   2,978,829
TROLLING SPOON
Filed May 8, 1959
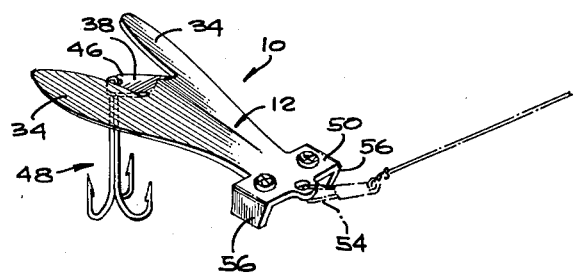
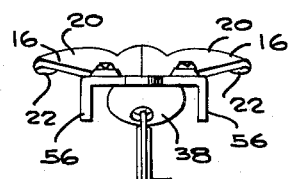
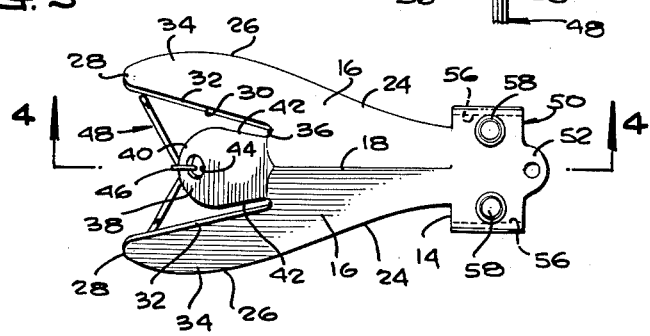
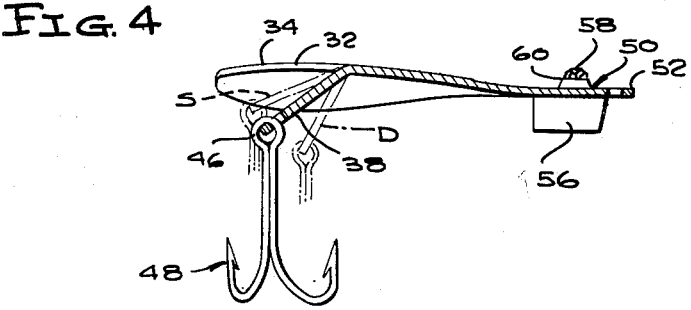
INVENTORS
LYMAN R. NETHERTON
& JESSE G. BAKER
BY
*McMorrow, Berman + Davidson*
ATTORNEYS

2,978,829

TROLLING SPOON

Lyman R. Netherton, 40 Le Blanc St., and Jesse G. Baker, 44 Le Blanc St., both of River Rouge, Mich.

Filed May 8, 1959, Ser. No. 811,856

3 Claims. (Cl. 43—42.22)

This invention relates to improvements in spoons for casting and trolling, and more particularly to a novel and improved device of this kind, of bug-simulating form, which is adjustable to vary its actions when drawn through water.

The primary object of the invention is to provide a more efficient and more versatile device of the character indicated above, which is designed to go deep in the water when drawn along at slow speeds, and to go shallow in the water at higher speeds, and which has, at all speeds a quick wiggling swimming action.

Another object of the invention is to provide a device of the character indicated, which has a trailing, centrally located diving foil which is rearwardly and downwardly angled out of the horizontal plane of the body of the device, and which is designed to be adjusted to different angles to the plane of the body to vary the diving actions of the device.

A further object of the invention is to provide a device of the character indicated above which has balancing and stabilizing vanes on its head which act to hold the head straight ahead and prevent over-turning of the device when the device is drawn through the water, while permitting or enhancing gyrations of the rear part of the device, so as to simulate the motions of a bait fish in water.

Other important objects and advantageous features of the invention will be apparent from the following description and the accompanying drawings, wherein, for purposes of illustration only, a specific form of the invention is set forth in detail.

In the drawings:

Figure 1 is a front perspective view of a device of the invention, attached to a fishing line leader;

Figure 2 is a fragmentary front end elevation of the device of Figure 1;

Figure 3 is an enlarged top plan view of the device; and

Figure 4 is a vertical longitudinal section taken on the line 4—4 of Figure 3, showing the diving foil or drag in one position in solid lines, and in adjusted positions in phantom lines.

Referring in detail to the drawings, wherein like numerals designate like parts throughout the several views, the illustrated device, generally designated 10, comprises a longitudinally elongated substantially flat plate 12, preferably made of one of a variety of suitable metals, and which can be given any desired color or colors.

The plate 12 is flared rearwardly from a relatively narrow forward end 14, and has elongated and rearwardly flared side portions 16, 16 which are canted in planes which decline or are angled laterally outwardly and downwardly from a longitudinal centerline 18. As seen in Figures 2 and 4, the lateral declination of the side portions 16 increases gradually from the forward end 14 to the rear ends of the side portions, in substantial correspondence to the increases in width, from front to rear, of the side portions 16. Further, as seen in Figure 2, the side portions 16 have preferably slight convex-concave transverse cross sectional forms, which produce convex upper surfaces 20 and concave undersurfaces 22, which terminate at their laterally outward boundaries in edges 24 which, besides being rearwardly divergent with respect to the centerline 18, are rearwardly and laterally curved, as indicated at 26, to arcuate or transversely rounded rear ends 28.

The plate 12 has in its rear end a relatively wide and deep notch 30, which extends forwardly in the plate for about one-third of the length of the plate, and has substantially straight, rearwardly diverging side edges 32, which merge into the arcuate rear ends 28 of the side portions 16. The notch 30 defines, at the opposite sides thereof, relatively narrow and longitudinally elongated and rearwardly directed fins or water planes 34, which are rear end portions of the plate side portions 16.

The notch 30 terminates at its forward end in a forward edge 36, on which is an adjustable rearwardly extending and declining water foil or drag 38, which is narrower than the notch 30 and has an arcuate or transversely rounded rear end 40 which is spaced a substantial distance forwardly from the rear ends 28 of the fins 34. The drag 38 is slightly rearwardly flaring in plan, and has rearwardly divergent side edges 42 which are spaced parallel from the side edges 34 of the notch 30. The drag 38 has at its rear end a fishhook attachment hole 44, through which is freely engageable the eye 46 of such as a gange hook 48. As seen in Figure 4, the drag 38 normally occupies a rearwardly declining or downwardly angled relation to the plate 12, so that its rear end is on a level below the fins 34. In order to vary the diving and wiggling characteristics of the device, the drag 38 is adapted to be bent up from the full line position to the phantom line position, indicated at S, to provide for relatively shallower diving action; or to the phantom line position, indicated at D for deeper diving action, as the device is drawn forwardly through the water.

On and coplanar with the forward end of the plate 12 is a flat, preferably rectangular and transversely elongated head 50, which is wider than the forward end of the plate 12, and lies in the general horizontal plane of the plate 12. The head 50 has on its forward edge a central, forwardly projecting apertured ear 52 for attachment of a fishing line lead swivel 54 thereto, the ear 52 being on the central longitudinal axis of the device.

For stabilizing the device 10 while being drawn forwardly through water, and preventing excessive sidewise movements of the device, on a vertical axis near the head 50, and on the vertical axis of the hole in the ear 52, and to resist over-turning of the device in the water, depending vanes 56 are provided on the ends of the head 50, which extend along the outer edges of the head 50, preferably for the full length of these outer edges. As seen in Figures 2 and 4, the stabilizing vanes 56 are generally rectangular in plan, and relatively wide or deep, and are disposed substantially at right angles to the underside of the head 50.

It will be evident that whenever the device side-slips, in swinging laterally, the rear fin 34, being downwardly canted, serves to tilt the device downwardly and sidewise in the same direction, and that this rotation on the longitudinal axis of the device is in addition to or a component of the diving and planing action produced by the drag 38. The stabilizing vanes 56 serve to prevent these actions from becoming vagrant and of excessive amplitude, and to return the device toward rectilinear action in the water, or to initiate similar but opposite actions by the fin at the opposite side of the device. As a result, the changing actions of the device are quick and wiggling in kind, and thereby highly simulative of the actions, and attractions to fish, of live bait.

In order to provide further simulation of live bait, light catching and reflecting, preferably jewel-cut fish "eyes" 58 are provided on the upper side of the head 50 at the ends thereof, which are preferably set into and rise out of mountings 60 fixed on the head, so as to simulate the eyes of a live bait fish.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A trolling spoon comprising a generally flat and longitudinally elongated plate, said plate having a forward end, a rear end, and side edges flaring rearwardly from said forward end, a flat head on and extending forwardly from said forward end, fishing line attaching means on the forward edge of said head, said plate having a notch in its rear end extending forwardly in the plate and having a forward edge and side edges, a rearwardly declining water foil on and extending rearwardly from the forward edge of said notch, said foil having side edges spaced from the side edges of the notch, said foil being bendable to different declining angles relative to the generally horizontal plane of said plate, and fishhook attaching means on said foil at the rear end thereof, said head having ends, and depending longitudinally extending stabilizing vanes on the ends of said head.

2. A trolling spoon comprising a generally flat and longitudinally elongated plate, said plate having a forward end, rear end, and side edges flaring rearwardly from said forward end, a flat head on and extending forwardly from said forward end, fishing line attaching means on the forward edge of said head, said plate having a notch in its rear end extending forwardly in the plate and having a forward edge and side edges, a rearwardly declining water foil on and extending rearwardly from the forward edge of said notch, said foil having side edges spaced from the side edges of the notch, said foil being bendable to different declining angles relative to the generally horizontal plane of said plate, and fishhook attaching means on said foil at the rear end thereof, said head having ends which are spaced laterally outwardly from the side edges of the plate at the forward end of the plate, and parallel longitudinal stabilizing vanes on and depending from the ends of the head.

3. A trolling spoon comprising a longitudinally elongated substantially flat plate having a forward end and a rear end, said plate having rearwardly divergent side edges extending from said forward end to said rear end, said plate having rearwardly flaring side portions extending between said forward and rear ends, said side portions being downwardly and laterally outwardly angled from the longitudinal centerline of the plate, said plate having a centered longitudinally elongated notch in its rear end extending equally in both of said side portions and defining relatively narrow rearwardly divergent fins, said notch having a forward end and sides, a downwardly and rearwardly angled water foil on the forward end of the notch and spaced from the sides of the notch, said fins extending rearwardly beyond said foil, and line attaching means on the forward end of the body, said line attaching means comprising a flat head having side edges having downwardly extending longitudinal fins thereon.

References Cited in the file of this patent

UNITED STATES PATENTS

| | | |
|---|---|---|
| D. 155,133 | Dow | Sept. 13, 1949 |
| 967,660 | Pedersen | Aug. 16, 1910 |
| 1,123,717 | Fey | Jan. 5, 1919 |
| 2,747,319 | Rondello | May 29, 1956 |